Aug. 29, 1950  J. L. HOPPER  2,520,365
AUTO MIRROR BRACKET
Filed April 16, 1946

INVENTOR.
JAMES LEO HOPPER
BY
HIS ATTORNEY

Patented Aug. 29, 1950

2,520,365

UNITED STATES PATENT OFFICE 2,520,365

AUTO MIRROR BRACKET

James Leo Hopper, Albany, Calif.

Application April 16, 1946, Serial No. 662,648

3 Claims. (Cl. 248—295)

This invention relates to rear view mirrors for automobiles; the major object being to provide what I believe to be a novel mounting for such a mirror which enables the same to be readily adjusted up or down to suit individual requirements as well as having the usual universal swivel movement.

Figure 1:
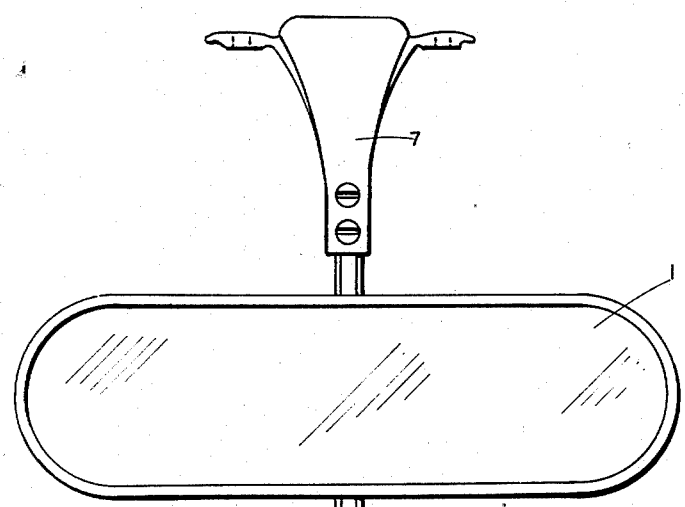
Figure 1 is a front view of a rear view mirror and its mounting.
Figure 2:
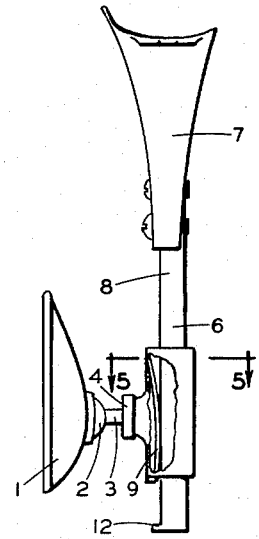
Figure 2 is a side view of the device, with the mounting partly broken out.
Figure 3:
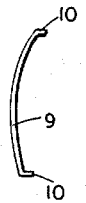
Figures 3 and 4 are side and front views respectively of the friction spring, detached.
Figure 4:
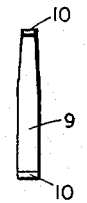
Figures 5, 6:
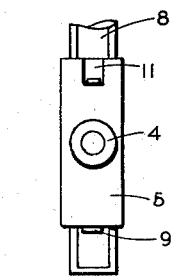
Figure 5 is a cross section on line 5—5 of Fig. 2.
Figure 6 is an enlarged front view of the mirror mounting, with the mirror detached.

Referring to the numerals of reference on the drawings, and particularly at present to Figures 1 to 6, the mirror 1, of any desired shape, is provided on the back with a ball and socket joint 2, from the ball of which a threaded stem 3, projects rearwardly. The stem screws into a boss 4, formed midway in the length of a sleeve 5. This sleeve is slidable on a shaft 6, rigidly secured on and depending from a bracket 7, adapted to be secured to the roof of the car adjacent the windshield.

The front of the shaft is flattened as at 8, to provide clearance in the sleeve for a flat leaf spring 9, which bears against said flattened portion 8, of the shaft and thus not only holds sleeve against slipping down the shaft with vibration, but prevents rotation of the sleeve on the shaft. The spring is formed with abrupt out-turned ends 10, the lower one of which engages under the sleeve while the upper one is held in a notch 11, cut in the top of the sleeve.

It will thus be seen that the height of the mirror may be easily adjusted by sliding the sleeve up or down the shaft. The sleeve cannot accidentally slide from the shaft by reason of a projecting lip 12, on the lower end of the shaft.

Figure 7:
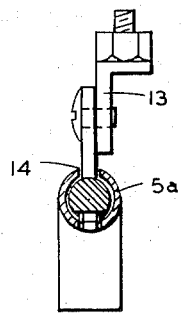
Figure 7 is a cross sectional view similar to Figure 5, but showing a modified form of supporting bracket.
Figure 8:
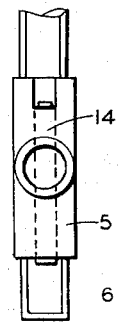
Figure 8 is a front view of the same.
Figure 9:
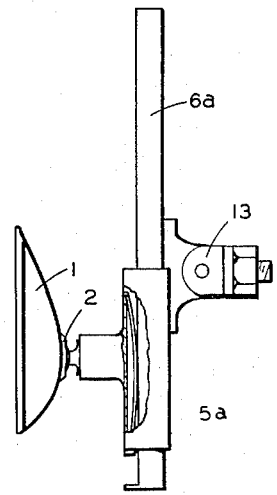
Figure 9 is a side view of said modified mounting, with the sleeve partly broken out.

In the structure shown in Figures 7 to 9, the mounting bracket 13, is of the swivel type, and is secured on and projects from the back of shaft 6a. In this case, the mirror connected sleeve 5a is split down the back as at 14 to miss the adjacent portion of the bracket, which is relatively thin as plainly seen in Figure 7. Apart from these differences, the construction and operation of the device are substantially the same as in the first described type.

I claim:

1. A rear vision mirror mounting assembly, comprising a bracket attached to a vehicle inside thereof over a windshield, a substantially vertical shaft fixedly attached to the bracket, a sleeve slidable on the shaft, said shaft having a front flattened side, a flat spring having means on the ends thereof for being removably secured to the sleeve, said spring being adapted to slide and to exert pressure upon said flattened side of the shaft to provide sufficient friction therebetween to yieldably resist sliding of the sleeve on the shaft, and a mirror adjustably carried by said sleeve.

2. A rear vision mirror mounting assembly, comprising a bracket attached to a vehicle inside thereof over a windshield, a substantially vertical shaft fixedly attached to the bracket, a sleeve slidable on the shaft, said shaft having a front flattened side, a flat spring having means on the ends thereof for being removably secured to the sleeve, said spring being adapted to slide and to exert pressure upon said flattened side of the shaft to provide sufficient friction therebetween to yieldably resist sliding of the sleeve on the shaft, a mirror, and a ball and socket joint connecting said mirror and said sleeve.

3. A rear vision mirror mounting assembly, comprising a bracket attached to a vehicle inside thereof in front of the windshield, a substantially vertical shaft fixedly attached to the bracket, a sleeve slidable on the shaft, said shaft having a front flattened side and means on the back side thereof for preventing said bracket from rotating on said shaft, a flat spring having means on the ends thereof for being removably secured to the sleeve, said spring being adapted to slide and to exert pressure upon said flattened side of the shaft to provide sufficient friction therebetween to yieldably resist sliding of the sleeve on the shaft, and a mirror adjustably carried by said sleeve.

JAMES LEO HOPPER.

REFERENCES CITED

The following references are of record in the file of this patent:

UNITED STATES PATENTS

| Number | Name | Date |
|---|---|---|
| 1,232,564 | Karges | July 10, 1917 |
| 1,646,379 | Whitehead | Oct. 18, 1927 |
| 1,772,233 | Vivier | Aug. 5, 1930 |
| 1,868,031 | Sudbrink | July 19, 1932 |
| 1,933,333 | Morgan | Oct. 31, 1933 |